(12) United States Patent
Robinson et al.

(10) Patent No.: US 9,666,398 B2
(45) Date of Patent: May 30, 2017

(54) ANGLED PLUG-ON NEUTRAL CONNECTORS, CIRCUIT BREAKERS INCLUDING SAME, PANEL BOARDS INCUDING ANGLED NEUTRAL BARS, AND METHODS OF MAKING NEUTRAL CONNECTIONS

(71) Applicant: Siemens Industry, Inc., Alpharetta, GA (US)

(72) Inventors: Kristopher Scott Robinson, Atlanta, GA (US); Jeffrey Kenton Hudgins, Jr., Gainesville, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 71 days.

(21) Appl. No.: 14/854,158

(22) Filed: Sep. 15, 2015

(65) Prior Publication Data
US 2017/0076896 A1 Mar. 16, 2017

(51) Int. Cl.
| H01H 71/02 | (2006.01) |
| --- | --- |
| H01R 13/652 | (2006.01) |
| H01R 24/66 | (2011.01) |
| H01R 13/18 | (2006.01) |
| H01H 71/10 | (2006.01) |
| H01R 103/00 | (2006.01) |

(52) U.S. Cl.
CPC ........ *H01H 71/0207* (2013.01); *H01H 71/10* (2013.01); *H01R 13/18* (2013.01); *H01R 13/652* (2013.01); *H01R 24/66* (2013.01); *H01R 2103/00* (2013.01)

(58) Field of Classification Search
CPC ...... H01R 31/00; H01R 25/162; H02B 1/056; H02B 1/20; H02B 1/052
USPC ........ 200/51 R; 361/115, 637, 673; 439/214, 439/652
See application file for complete search history.

(56) References Cited

U.S. PATENT DOCUMENTS

| 8,049,126 | B2 | 11/2011 | Chen et al. |
| 8,693,169 | B2 | 4/2014 | Diaz |
| 8,929,055 | B2 | 1/2015 | Potratz et al. |
| 2011/0002089 | A1 | 1/2011 | Sharp |
| 2013/0164961 | A1* | 6/2013 | Diaz ..................... H02B 1/056 439/214 |
| 2014/0321005 | A1 | 10/2014 | Samuelson et al. |

(Continued)

*Primary Examiner* — Edwin A. Leon
*Assistant Examiner* — Ahmed Saeed

(57) ABSTRACT

An angled plug-on neutral connector assembly of a circuit breaker. Angled plug-on neutral connector assembly includes a molded case including a bottom plane and a retaining portion, and a neutral connector received and constrained in the retaining portion, the neutral connector including a connector body including first and second prongs, and an opening between the prongs configured to receive a neutral bar. The opening is oriented in an angled orientation to the bottom plane, as defined by a connector angle measured between the bottom plane and a bisector line between the first and second prongs, wherein the connector angle is between about 30 degrees and about 70 degrees. Electronic circuit breakers including the angled plug-on neutral connector assembly, panel boards including angled neutral bars, and methods of making neutral connections between angled neutral bars and angled neutral connectors of circuit breakers are provided, as are other aspects.

10 Claims, 12 Drawing Sheets

(56) References Cited

U.S. PATENT DOCUMENTS

2016/0141134 A1* 5/2016 Pearson ................. H01H 9/20
200/50.21

* cited by examiner

ANGLED PLUG-ON NEUTRAL CONNECTORS, CIRCUIT BREAKERS INCLUDING SAME, PANEL BOARDS INCUDING ANGLED NEUTRAL BARS, AND METHODS OF MAKING NEUTRAL CONNECTIONS

FIELD

Embodiments of the present invention relate to electronic circuit breakers used for arc fault and/or ground fault detection, and more specifically to plug-on neutral connectors for making electrical neutral connections between such electronic circuit breakers and neutral bars.

BACKGROUND

As shown in FIG. 1A, prior art electronic circuit breakers 100A used for arc fault and/or ground fault detection, such as Ground Fault Circuit Interrupters (GFCIs) and Combination Arc Fault Circuit Interrupters (CAFCIs), typically include a pigtail wire 102 that is used to connect to the panel board neutral, such as neutral bar. The pigtail wire 102 connects internally to the electronics of the electronic circuit breaker 100A. Certain single-pole and two-pole electronic residential electronic circuit breakers 100A may use mounting features, such as a mounting tab 103 on the load side of the circuit breaker 100A to help hold the circuit breaker 100A in position on a panel board.

In the depicted embodiment, the pigtail wire 102 may have a length of about 13 inch (33 cm) to about 20 inch (51 cm) of 12 AWG wire used to connect to the neutral bar on the panel board. The free end of the pigtail wire 102 may be secured into a neutral socket of the neutral bar, and may be held in place with a screw. During installation, the pigtail wire is unraveled, measured, cut to length, end stripped, and then manipulated into place in a neutral socket of the neutral bar. This is a very labor intensive process.

While circuit breakers have historically used a pigtail wire 102 to connect to the panel board neutral bar, recently some manufacturers have begun to use a plug-on connector, such as a C-clip 104 shown in FIG. 1B, to connect directly to a neutral bar of a panel board on the underside of the circuit breaker 100B. In this plug-on neutral connector design, the circuit breaker 100B is pushed directly onto a stab on the line side and directly onto the neutral bar of the panel board on the load side.

Existing pigtail neutral designs have a disadvantage of relatively high installation costs when an installer unravels, measures, cuts to length, strips the end of insulation, and then manipulates the pigtail wire 102 to insert the stripped end into a neutral socket of the neutral bar. Existing C-clip neutral connector designs, such as shown in FIG. 1B, have the disadvantage that once the circuit breaker is plugged onto the stab and neutral bar, there is limited ability to capture the breaker from coming off (becoming unplugged) or keep it from moving around.

Accordingly, there is a need for an improved method of connecting the circuit breaker neutral to the neutral bar of the panel board.

SUMMARY

In accordance with a first aspect, a plug-on neutral connector is provided. The plug-on neutral connector includes a molded case including a bottom plane and a retaining portion, and a neutral connector received in the retaining portion, the neutral connector including a connector body including a first prong, a second prong, and an opening between the first prong and second prong configured to receive a neutral bar, wherein the opening is oriented in an angled orientation to the bottom plane, the angled orientation being defined by a connector angle measured between the bottom plane and a bisector line between the first prong and the second prong, wherein the connector angle is between about 30 degrees and about 70 degrees.

According to another aspect, a circuit breaker is provided. The circuit breaker includes a molded case including a top side with a handle, a bottom side opposite the top side, and a retaining portion, the bottom side including a bottom plane, and a neutral connector received in the retaining portion, the neutral connector including a connector body including a first prong, a second prong, and an opening between the first prong and second prong configured to receive a neutral bar, wherein the opening is oriented in an angled orientation to the bottom plane, the angled orientation being defined by a connector angle measured between the bottom plane and a bisector line between the first prong and the second prong, wherein the connector angle is between about 30 degrees and about 70 degrees.

According to another aspect, a panel board is provided. The panel board includes a base pan of an insulating material, the base pan including a mounting plane configured to mount a circuit breaker; and a neutral bar coupled to the base pan, the neutral bar including a neutral axis, wherein the neutral axis is mounted to the base pan at an angled orientation defined by a bar angle measured between the mounting plane and the neutral axis, and wherein the bar angle is between about 30 degrees and about 70 degrees According to another aspect, a method of making an electrical neutral connection is provided. The method includes providing a panel board including a base pan of an insulating material, the base pan including a mounting plane, and a neutral bar coupled to the base pan, the neutral bar including a neutral axis, wherein the neutral axis is mounted to the base pan at an angled orientation defined by a bar angle measured between the mounting plane and the neutral axis, and wherein the bar angle is between about 30 degrees and about 70 degrees, providing a circuit breaker including a molded case comprising a bottom plane and a retaining portion, and a plug-on neutral connector assembly, comprising: a neutral connector received in the retaining portion, the neutral connector including a connector body including a first prong, a second prong, and an opening between the first prong and second prong configured to receive the neutral bar, wherein the opening is oriented at an angled orientation to the bottom plane, the angled orientation defined by a connector angle measured between the bottom plane and a bisector line between the first prong and the second prong, wherein the connector angle is between about 30 degrees and about 70 degrees, and mounting to the circuit breaker to the panel board wherein the opening of the neutral connector is received over the neutral bar.

Still other aspects, features, and advantages of the present invention may be apparent from the following description and example embodiments, including the best mode contemplated for carrying out the present invention. The present invention may be capable of different embodiments, and its details may be modified without departing from the scope of the present invention. The invention is to cover all modifications, equivalents, and alternatives within the scope of the claims.

BRIEF DESCRIPTION OF DRAWINGS

The drawings, described below, are for illustrative purposes only and are not necessarily drawn to scale. The drawings are illustrative and not intended to limit the scope of the invention in any way. Wherever possible, the same or like reference numbers will be used throughout the drawings to refer to the same or like parts.

DESCRIPTION

To assist in speeding up the process of making a neutral connection between a circuit breaker and a neutral bar, it is desirable to remove the external pigtail and/or the neutral bar screw and replace it with a quick-connect plug-on feature.

One or more embodiments of the present invention utilizes an angled plug-on neutral connector of the circuit breaker that enables making a rapid electrical neutral connection to an angled neutral bar of a panel board in accordance with one or more embodiments. "Neutral bar" as used herein means any elongate structure to which the neutral connector of the circuit breaker is connected to in order to complete an electrical neutral connection to the circuit breaker.

According to one or more embodiments, the neutral bar connection is made by installing the circuit breaker onto the panel board wherein an angled orientation of the angled plug-on connector is received over a neutral bar, also including an angled orientation. The opening of the plug-on connector is oriented in an angled orientation relative to a bottom plane of the circuit breaker molded case, and may be angled towards the load side of the circuit breaker. The angled plug-on neutral connector may couple to a neutral bar that includes a generally matching angled orientation in some embodiments. This angled plug-on neutral connector and angled neutral bar combination allows for easy installation and minimizes damage to or overstressing of the neutral connector during installation.

These and additional embodiments of the angled plug-on neutral connector, circuit breakers including an angled plug-on neutral connector, panel boards including an angled neutral bar, and methods of making an electrical neutral connection between a circuit breaker and a neutral bar of a panel board are provided and described fully with reference to FIGS. 2A-6 herein.

Figure 1A:
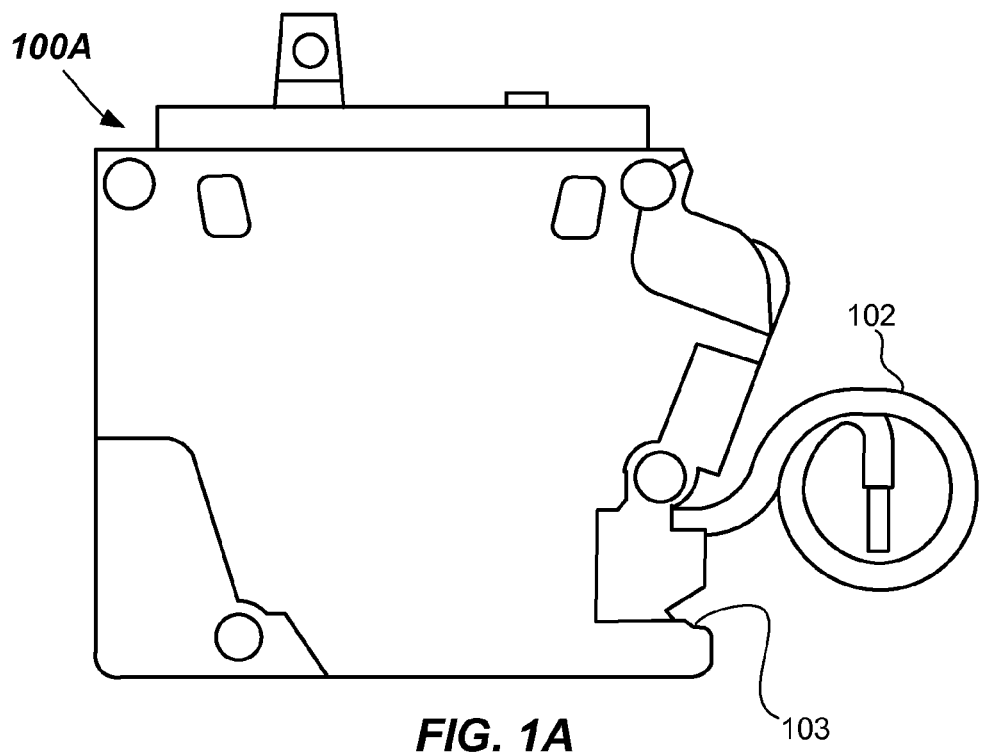
FIGS. 1A and 1B illustrate side views of conventional electronic circuit breakers (e.g., GFCI or CAFCI) with a coiled pigtail (FIG. 1A), and conventional electronic circuit breaker (e.g., GFCI or CAFCI) with C-clip neutral connector (FIG. 1B) adapted to plug onto a neutral bar in accordance with the prior art.
Figure 1B:
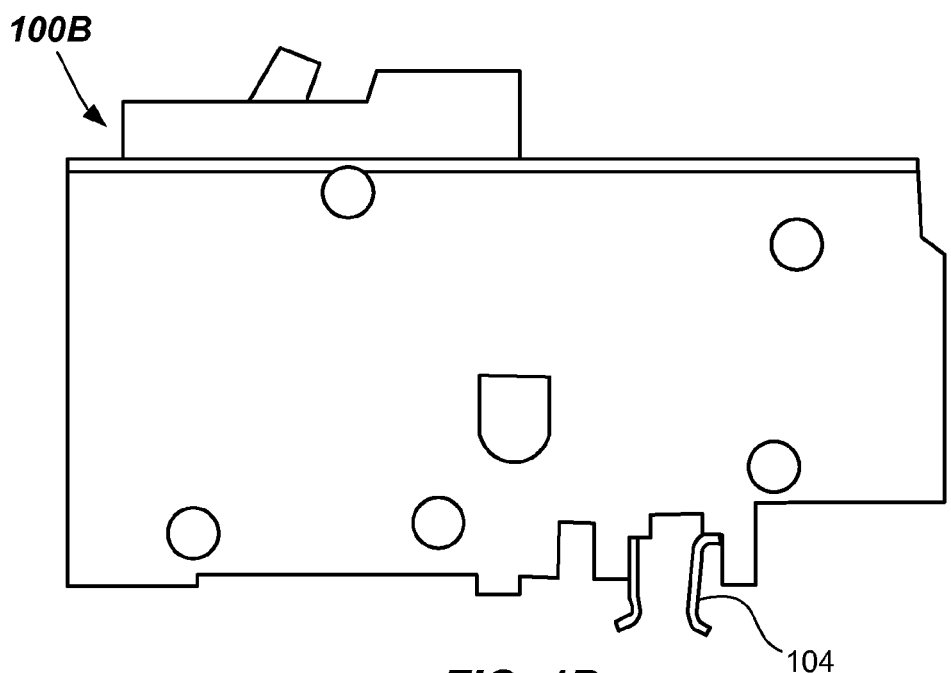
Figure 2A:
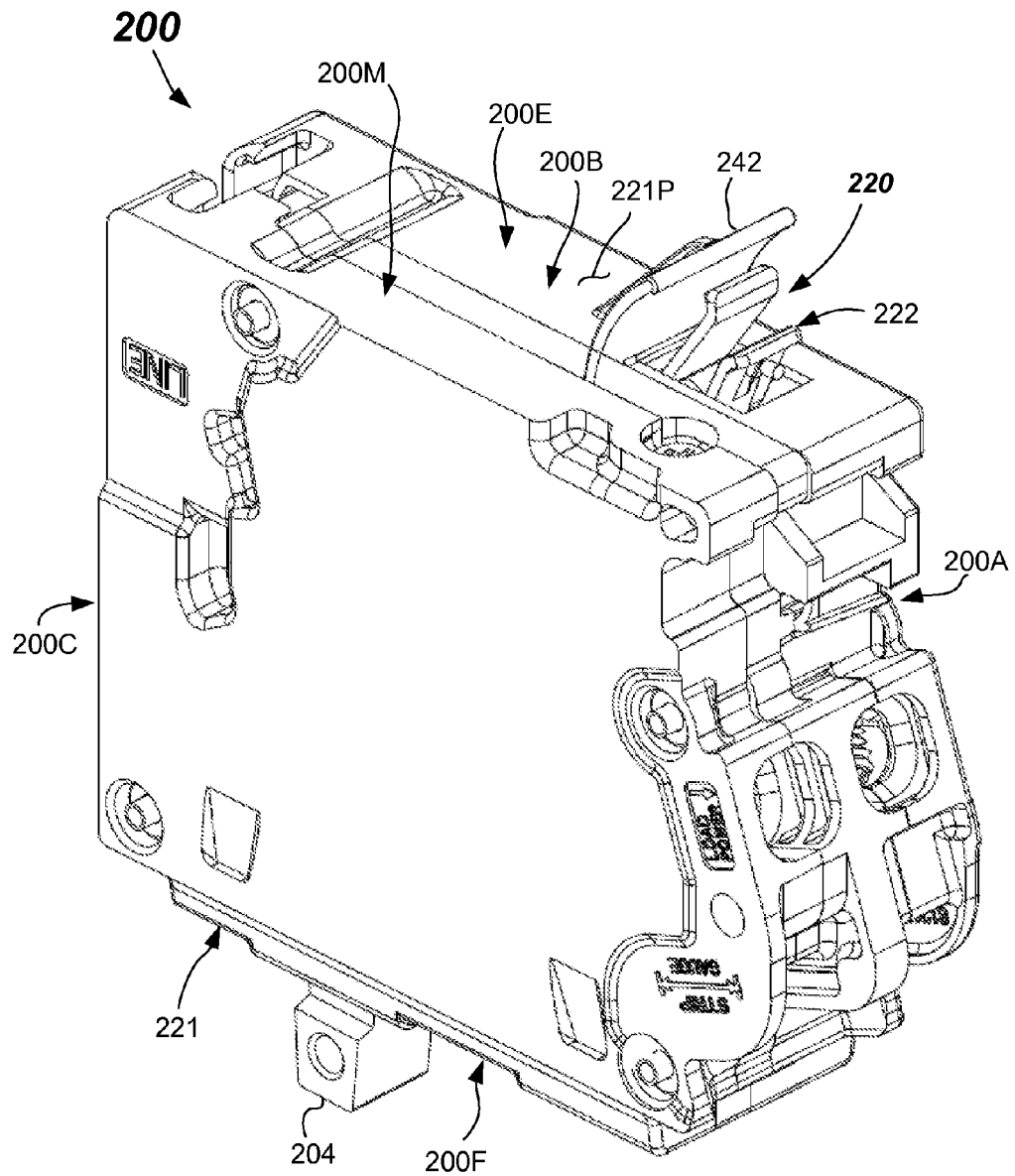
FIG. 2A illustrates an isometric view of an electronic circuit breaker (e.g., GFCI or CAFCI) including an angled plug-on neutral connector according to one or more embodiments.

Referring now to FIG. 2A, an isometric side view of a circuit breaker 200 including an angled plug-on neutral connector assembly 220 is illustrated. Circuit breaker 200 (shown inverted) includes a front side 200F including a breaker handle 204, and a bottom side 200B including a bottom plane configured to mount adjacent to a mounting plane of a panel board 226 (See FIG. 2F), a load side 200A to which electrical loads (e.g., branch circuits) may be attached, and a line side 200C, which may attach to a line conductor (e.g., a stab provided on the panel board) via a conventional c-clip type line side terminal connector not shown. Such line side terminal connectors are described in U.S. Pat. No. 8,049,126 to Chen, et al., for example. Other types of line side terminal connections may be used.

The circuit breaker 200 may include a mechanism pole 200M containing conventional tripping components, such as conductors, cradle, cradle spring, moving contact arm, moving and stationary electrical contacts, armature, and a thermal assembly of magnet and bimetal. The circuit breaker 200 may include an electronic pole 200E containing all the conventional electronics, sensor(s), actuator, and circuit components for sensing and determining an arc fault and/or ground fault condition and then actuating the tripping components. The components of the mechanism pole 200M and the electronic pole 200E, other than the angled plug-on neutral connector assembly 220 and portions of the molded case 221 receiving it are conventional and will not be discussed further herein.

In the depicted embodiment, the angled plug-on neutral connector assembly 220 is shown located on the bottom side 200B and toward the load side 200A of the electronic pole 200E. However, other locations may be used for the angled plug-on neutral connector assembly 220. Furthermore, while the circuit breaker 200 shown and described is a single-pole electronic circuit breaker, embodiments of the invention may be adapted for use with two-pole circuit breakers or multi-pole circuit breakers, as well.

Now referring to FIGS. 2A-2G and 3, the circuit breaker 200 including the angled plug-on neutral connector assembly 220 and components thereof are shown and described. The angled plug-on neutral connector assembly 220 includes the molded case 221 including a bottom plane 221P, a retaining portion 221R (FIG. 2F), and a neutral connector 222. Bottom plane 221P is defined as a plane along the bottom side 200B of the circuit breaker 200 that is configured to be placed closest to the panel board 226 when in use.

Neutral connector 222 is received and constrained in the retaining portion 221R and includes a connector body 224 including a first prong 224A and a second prong 224B that are configured to make electrical connection with a neutral bar 225 (FIG. 2F) of the panel board 226. First prong 224A and second prong 224B may be spaced apart by a distance less than a thickness of the neutral bar 225. The spaced apart gap may be approximately 2.3 mm or less at their closest point in an uninstalled condition, for example. An opening 230 may be provided between the first prong 224A and the second prong 224B and is configured to receive the neutral bar 225 therein, which may also be provided at an angled orientation as will be described further herein. Each of the first prong 224A and the second prong 224B may include a radius at a terminal end to assist in receiving the neutral bar 225. Radius may be between about 0.09 in (2.3 mm) and about 0.12 in (3.0 mm), for example. Other radii may be used. As the neutral connector 222 is pushed on to the neutral bar 225 of the panel board 226, the first prong 224A and the second prong 224B may deflect like beams and act as a spring to ensure proper clamping contact with the neutral bar 225.

In one or more embodiments, the opening 230 is provided at an angled orientation to the bottom plane 221P. In particular, the angled orientation of the neutral connector 222 is defined herein by reference to a connector angle 232 that is measured between the bottom plane 221P of the molded case 221 and a bisector line 234 (See FIGS. 2B and 2F) between the first prong 224A and the second prong 224B. The bisector line 234 is a line bisecting widths between multiple corresponding points that are an equal distance from a vertex 235 along the lengths of each of the first and second prongs 224A, 224B. Connecting the multiple half-width points along the lengths of the first and second prongs 224A, 224B defines the bisector line 234.

Figure 2B:
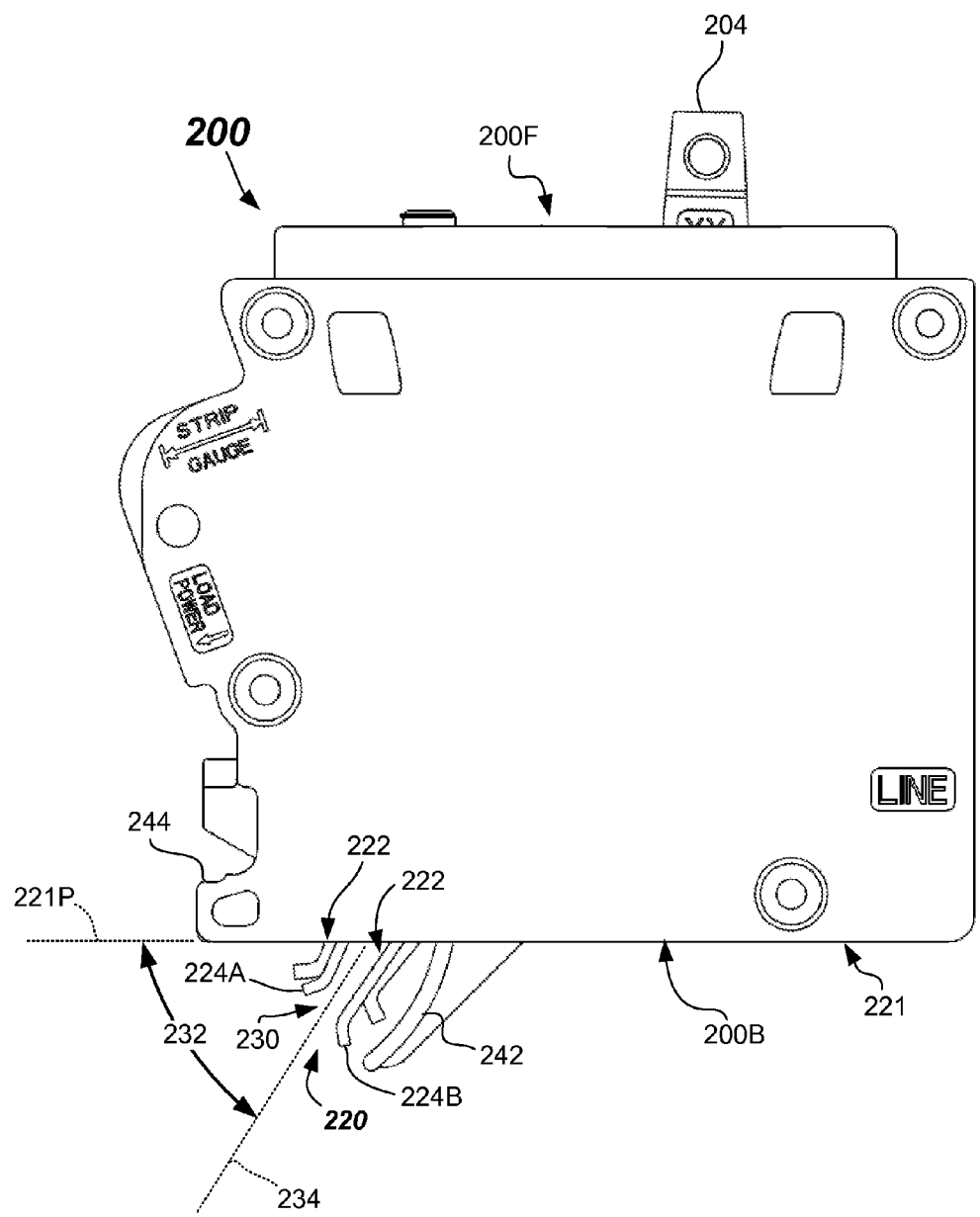
FIG. 2B illustrates a side plan view of an electronic circuit breaker (e.g., GFCI or CAFCI) including an angled plug-on neutral connector according to one or more embodiments.
Figures 2C, 2D:
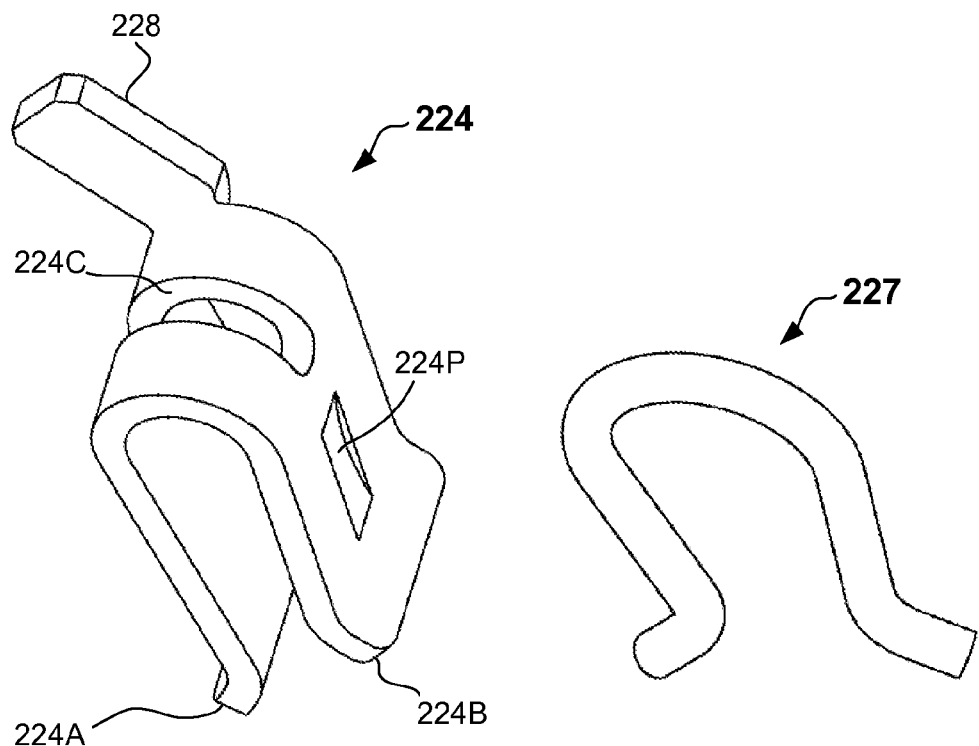
FIG. 2C illustrates an isometric view of a connector body of an angled plug-on neutral connector according to one or more embodiments.
FIG. 2D illustrates an isometric view of a spring clip of an angled plug-on neutral connector according to one or more embodiments.
Figure 2E:
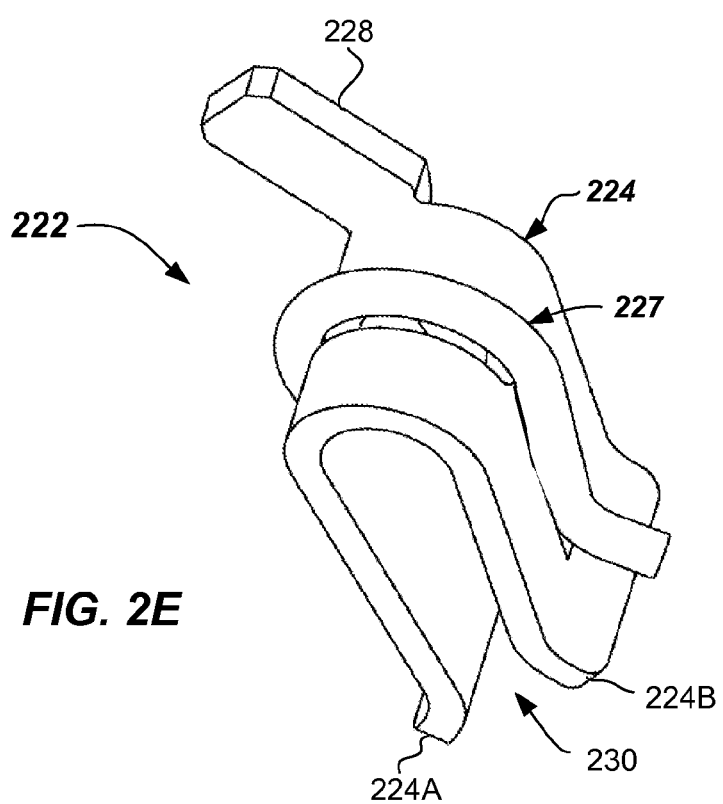
FIG. 2E illustrates an isometric view of a connector assembly including a connector body and spring clip of an angled plug-on neutral connector according to one or more embodiments.
Figure 2F:
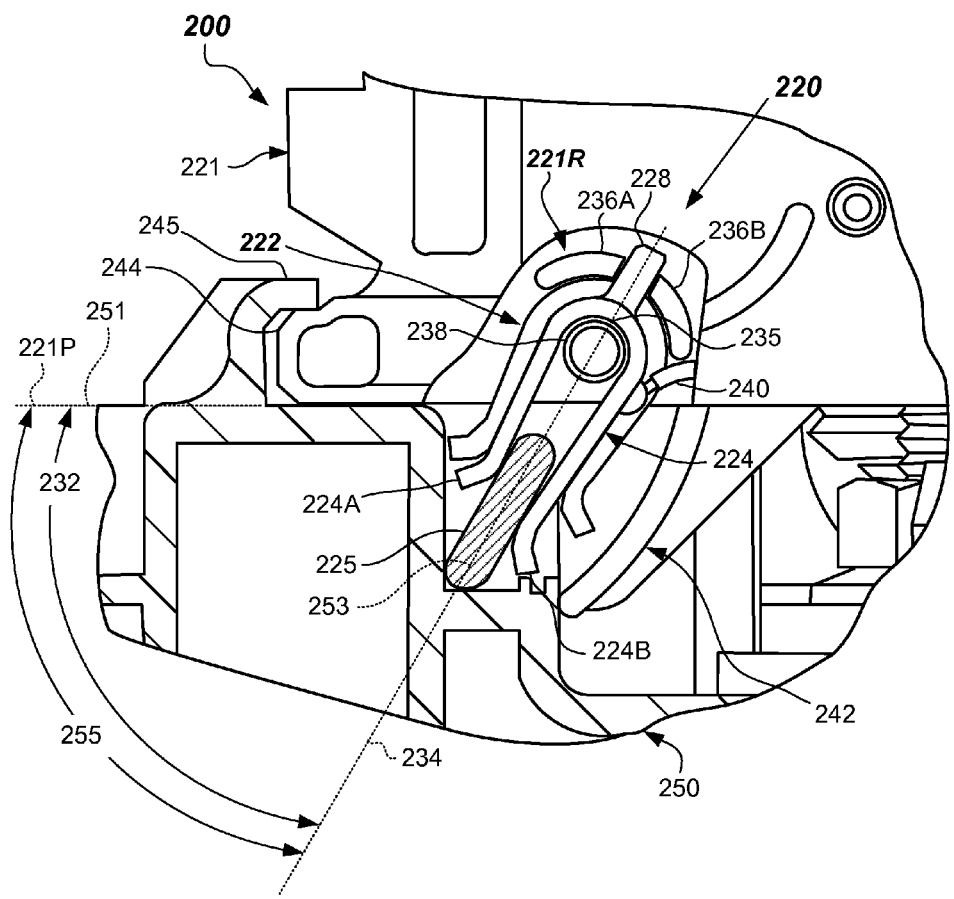
FIG. 2F illustrates a partial cross-sectioned side view of an electronic circuit breaker including a cut out section illustrating an angled orientation and retaining portion of a plug-on neutral connector when making a neutral electrical connection to an angled neutral bar of a panel board according to one or more embodiments.
Figure 2G:
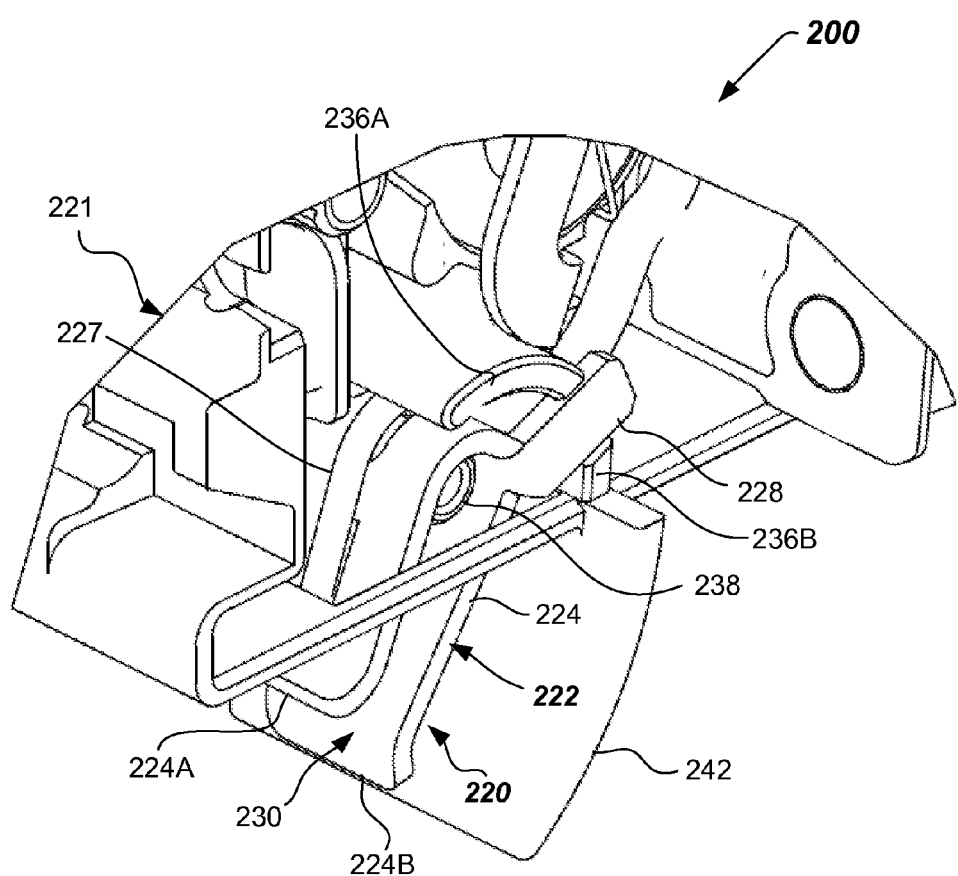
FIG. 2G illustrates a partial isometric view of an electronic circuit breaker including a plug-on neutral connector according to one or more embodiments.

The connector angle 232, as best shown in FIGS. 2B and 2F, in one or more embodiments, may be non-zero degrees and also non-ninety degrees, and may be between about 30 degrees and about 70 degrees in some embodiments. In other embodiments, the connector angle 232 may be between about 50 degrees and about 70 degrees, or even between about 55 degrees and about 65 degrees. The connector angle 232 may be about 60 degrees in some embodiments. This angled orientation of the neutral connector 222 relative to the bottom plane 221P makes it very easy to make a robust neutral connection with the neutral bar 225 and also relatively easy to install the circuit breaker 200 to the panel board 226.

In some embodiments, connector body 224 may include an anti-rotation feature 228. Anti-rotation feature 228 may be embodied as a tab, as shown, extending from the vertex 235 in a direction opposite from the first and second prongs 224A, 224B. The tab may be about 1 mm wide and about 6 mm long, for example, and may be configured to be received between stops 236A, 236B formed in part of the molded case 221. Stops 236A, 236B may be part of the retaining portion 221R that constrains the connector body 224 from rotation. Connector body 224 may have an overall width of about 7 mm wide and may be about 25 mm long and the second prong 224B may be longer than the first prong 224A, whereas the first and second prongs 224A, 224B may be between about 6 mm and 19 mm long measured in a straight line from the vertex 235 to a terminal end thereof. Connector body 224 may be made of a suitably conductive material, such as a copper, brass, or aluminum material. Other suitable electrically conductive material may be used. The retaining portion 221R is a portion of the molded case 221 that retains the connector body 224 in a defined location or position. In the depicted embodiment, the retaining portion 221R may include a pin 238, which positions the neutral connector 222 laterally along the bottom side 200B and along the bisector line 234 in one direction (preventing the neutral connector 222 from pulling out of the molded case 221). As discussed above, retaining portion 221R may include stops 236A, 236B. Stops 236A, 236B may comprise a wall that is abutted by the neutral connector 222 and prevents the neutral connector 222 from pushing further into of the molded case 221. Pin 238 may be received adjacent to a vertex 235 of the connector body 224. Other configurations of retaining portion 221R may be used for retaining the neutral connector 222 in a defined location or locations within the molded case 221.

As shown, neutral connector 222 may also include a spring clip 227, which may be received over the connector body 224 and come to rest in cutout 224C and recesses 224P (only one shown in FIG. 2C). Another like recess 224P may be provided on the first prong 224A. Spring clip 227 may assist in providing a suitable contact force on the neutral bar 225. Spring clip 227 may be made of a steel wire material, having a diameter of about 1.3 mm, for example. Other sizes and spring material may be used.

It should now be apparent that the rotation of the neutral connector 222 relative to the molded case 221 is controlled by the interaction of the anti-rotation feature 228 with the stops 236A, 236B. In one embodiment, a line fit (i.e., no clearance) is provided between the anti-rotation feature 228 and the stops 236A, 236B so that the rotation of the neutral connector 222 relative to the molded case 221 is substantially eliminated. However, it should also be apparent that a designed amount of desired rotation, i.e., pivoting of the connector body 224 about the pin 238 may be provided. For example, ends of stops 236A, 236B may be spaced from the anti-rotation feature 228 so that up to about +/−15 degrees, +/−10 degrees, +/−5 degrees, or even +/−3 degrees of rotation of the connector body 224 may be allowed.

A neutral conductor wire 240 may be fastened to the neutral connector 222, such as by welding to the connector body 224 thereof (FIG. 2F). Neutral conductor wire 240 may also attach to the electronics of the electronic pole 200M as is conventional, the details of which are conventional and are not shown herein.

Furthermore, angled plug-on neutral connector assembly 220 may include a shield 242 of an insulating material between the neutral connector 222 and the line side 200C. Shield 242 may be made of the same material as the molded case 221, such as a thermoplastic or thermosetting polymer insulating material, for example. Other suitable electrically insulating materials may be used. The shield 242 may function to protect the neutral connector 222 from being damaged during shipping and ordinary handling and may also provide an insulating shield between the A-phase bus bar 352A and B-Phase bus bar 352B and the neutral connector 222. Additionally, in one or more embodiment, the circuit breaker 200 may include a nose tab 244 that is configured to engage with a hook feature 245 of the panel board 226 as shown in FIG. 2F.

Figure 3A:
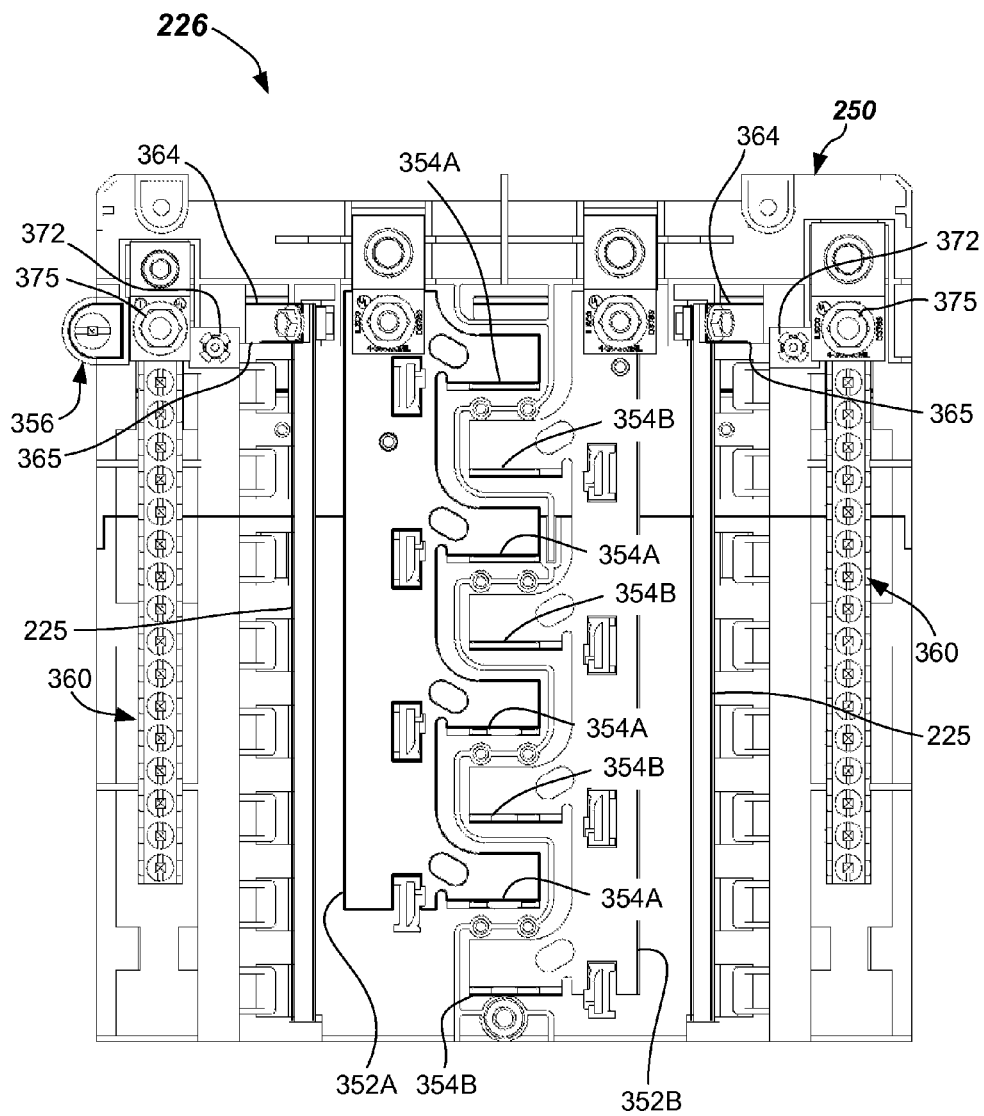
FIG. 3A illustrates a front plan view of a panel board including an angled neutral bar according to one or more embodiments.
Figure 3B:
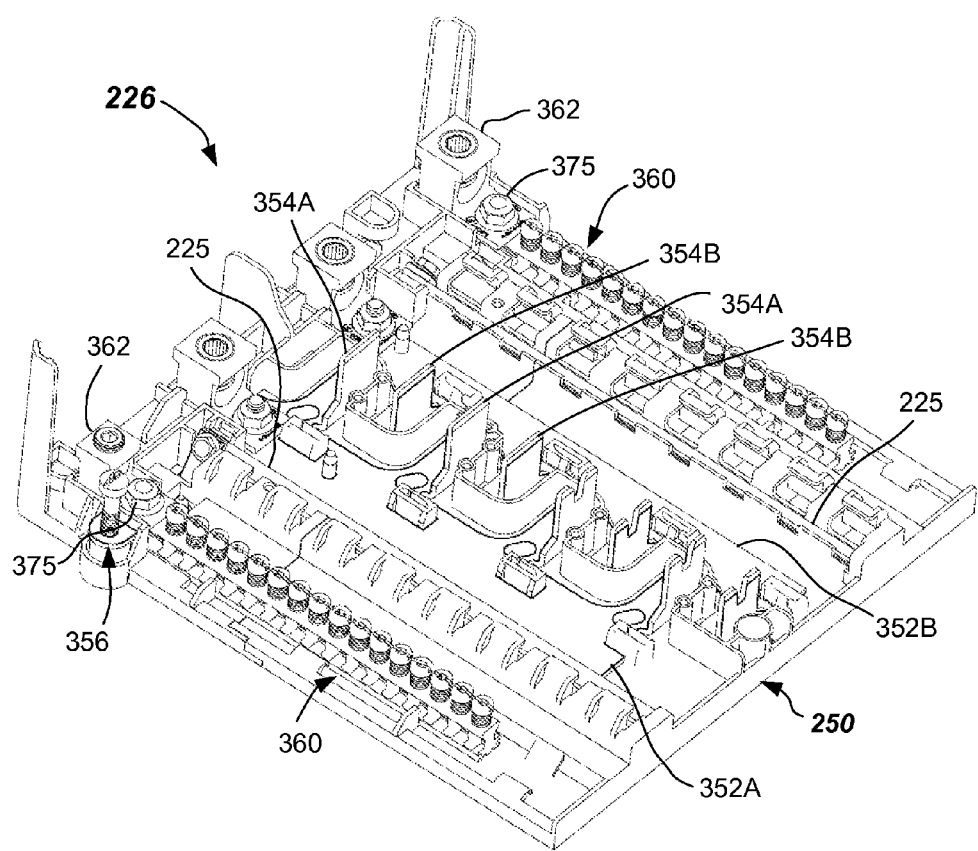
FIG. 3B illustrates an isometric view of a panel board including an angled neutral bar according to one or more embodiments.

Now referring to FIGS. 3A and 3B, an embodiment of a panel board 226 configured to engage with circuit breakers 200 including the previously-described angled plug-on connector assembly 220 is shown and described. The panel board 226 includes a base pan 250 made of an insulating material, such as thermoplastic polymer. The base pan 250 includes a mounting plane 251 (See FIG. 2F) including multiple locations for receiving a plurality of the circuit breakers 200 thereon. The bottom sides 200B of the plurality of circuit breakers 200 are configured to be mounted on the mounting plane 251 of the base pan 250. Mounting plane 251 may be made up of multiple points and/or surfaces all located in a common plane that are configured to contact the bottom plane 221P of the circuit breakers 200 that are coupled thereto. Circuit breaker 200 as used herein means any device operable to break electrical current provided to a connected branch circuit.

Panel board 226 includes one or more buses, such as A-phase bus 352A and B-phase bus 352B, that may be configured with stabs 354A, 354B that are connectable to line side terminals of the circuit breakers 200 in a conventional manner. Other numbers of buses may be used.

Panel board 226 includes a neutral assembly 356 including one or more neutral bars 225 provided in an angled orientation relative to the mounting plane 251 (FIG. 2F) of the base pan 250. The one or more neutral bars 225 may be coupled to the base pan 250, either by being coupled directly to the base pan 250 or by being coupled to the base pan 250 via an intermediate member, such as by part of the neutral assembly 356. The one or more neutral bars 225 each include a neutral axis 253 of a cross-section thereof, wherein the neutral axis 253 is mounted to the base pan 250 in an angled orientation relative to the mounting plane 251. The angled orientation is defined by a bar angle 255 that is measured between the mounting plane 251 of the base pan 250 and the neutral axis 253 of the neutral bar 225 (See FIG. 2F). The bar angle 255 may be non-zero degrees and also non-ninety degrees, and may be between about 30 degrees and about 70 degrees, or even between about 50 degrees and about 70 degrees, or even between about 55 degrees and about 65 degrees in some embodiments. The bar angle 255 may be about 60 degrees in some embodiments. The bar angle 255 may be approximately the same as the connector angle 232 in some embodiments.

Figure 4:
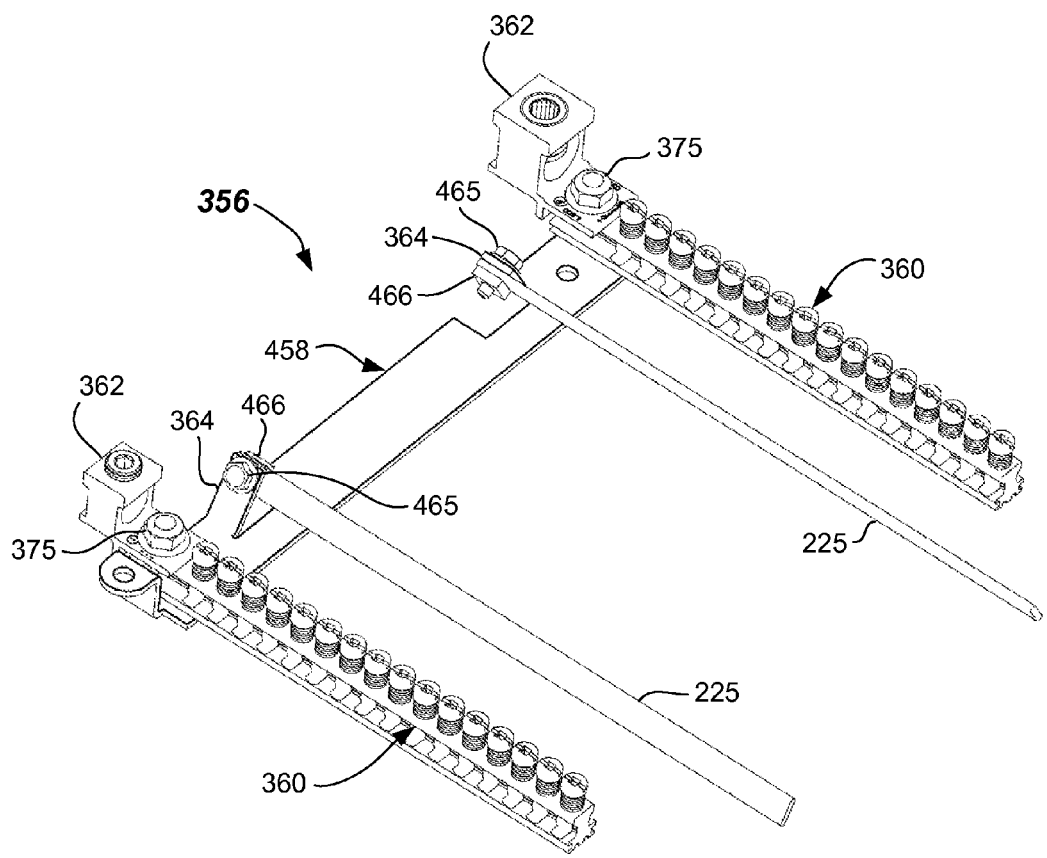
FIG. 4 illustrates a partial isometric view of a neutral assembly including an angled neutral bar, a cross bar, and a neutral bus member according to one or more embodiments.

In more detail, the neutral assembly 356 may include, as is depicted in FIGS. 3A and 3B and FIG. 4, includes a cross bar 458 which passes underneath the base pan 250, and the one or more angled cross bars 225 coupled to the cross bar 458. Neutral assembly 356 may include one or more neutral bus members 360, which may include multiple sockets and screws that are adapted to connect neutral (generally white) wires of various circuits coupled to a circuit breaker. A neutral terminal 362 may be provided on one side or both sides of the neutral assembly 356. The one or more neutral terminals 362 may be configured to receive a main neutral service line from the utility. Each of the one or more angled cross bars 225 may be coupled to angled risers 364 of the cross bar 458. The angled risers 364 may be received through openings 365 formed through the base pan 250. Coupling may be accomplished by fasteners, such as bolt 465 and nut 466 shown in FIG. 4. Cross bar 458 may be made of an electrically conductive material, such as copper or aluminum, for example.

Figure 5A:
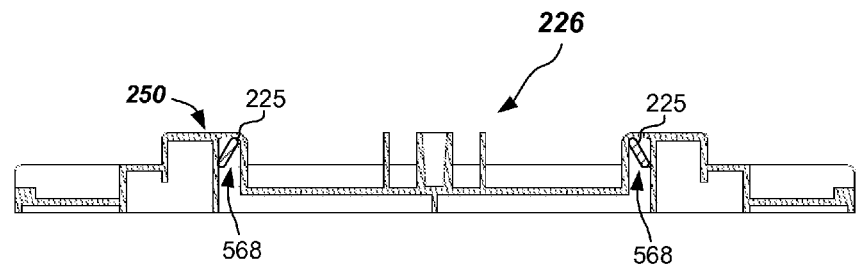
FIG. 5A illustrates a cross-sectioned side view of a panel board including an angled neutral bar according to one or more embodiments.

As is shown in FIG. 5A, each of the one or more angled cross bars 225 may be coupled to the base pan 250 on a second end that is opposite from the location of the connection to the angled risers 364. In particular, the second end of the one or more angled cross bars 225 may be received and captured in a pocket 568 that may be formed in the base pan 250. Between the ends, the one or more angled cross bars 225 may be supported on an upper surface of the base pan 250, for example, or otherwise secured in support features thereof.

Figure 5B:
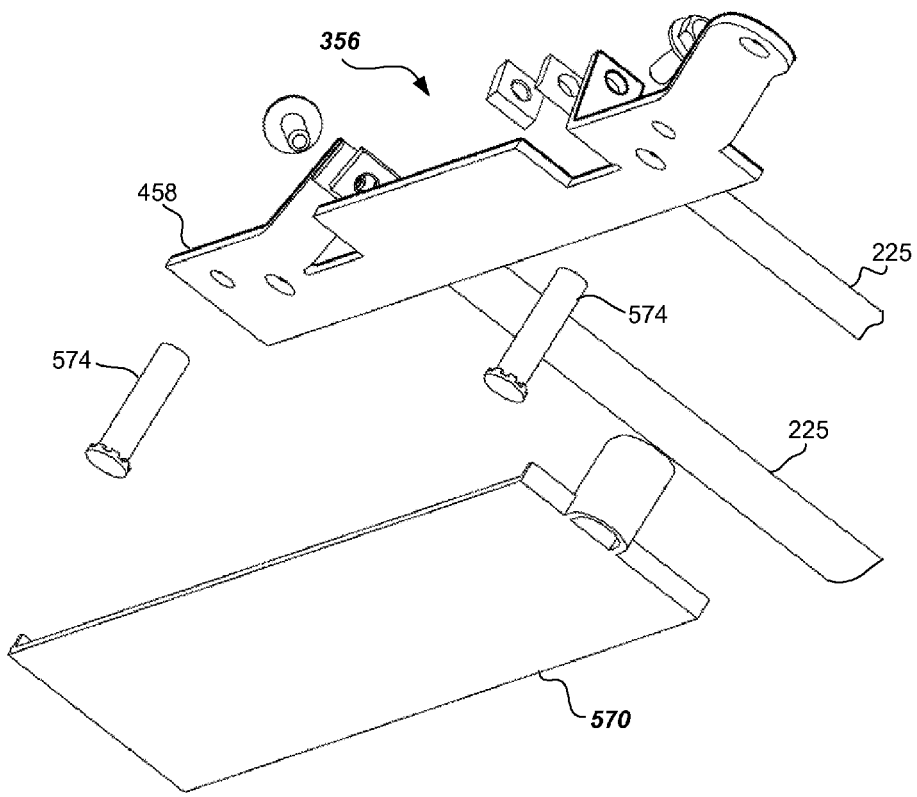
FIG. 5B illustrates a bottom exploded view of portions of a neutral assembly and a barrier member according to one or more embodiments.
Figure 5C:
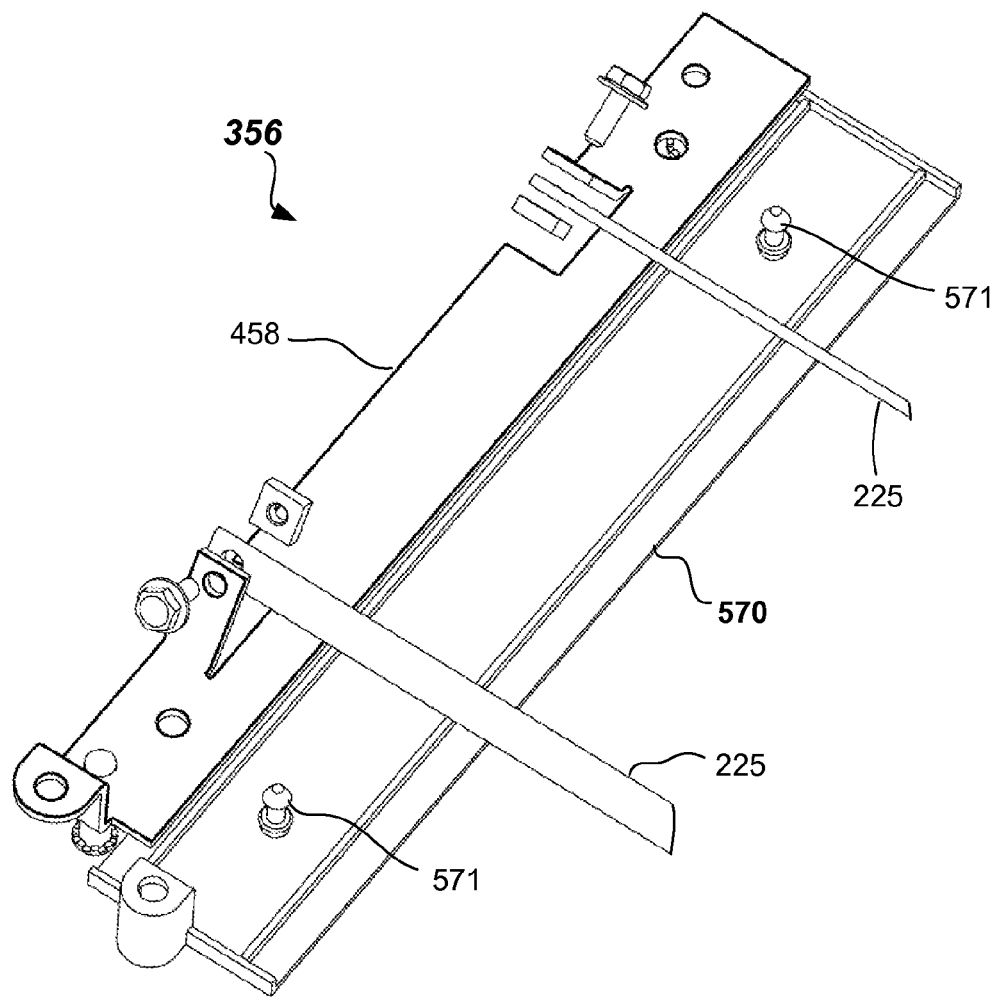
FIG. 5C illustrates a top exploded view of portions of a neutral assembly and a barrier member according to one or more embodiments.

As is shown in exploded FIGS. 5B and 5C, the panel board 226 may include a barrier member 570 that functions to cover the cross bar 458 below the base pan 250 and may function to insulate the neutral assembly 356 from any enclosure that the panel board 226 may be coupled to. Barrier member 570 may be fastened to the base pan 250 by snap features 571, which may be molded and that may be snapped into features 372 (FIG. 3A), which may be molded in the base pan 250. Castellated studs 574 may be press fit into the cross bar 458 and the neutral bus members 360 and neutral terminals 362 may be fastened thereto by nuts 375 (See FIGS. 3A-3B and 4).

Figure 6:
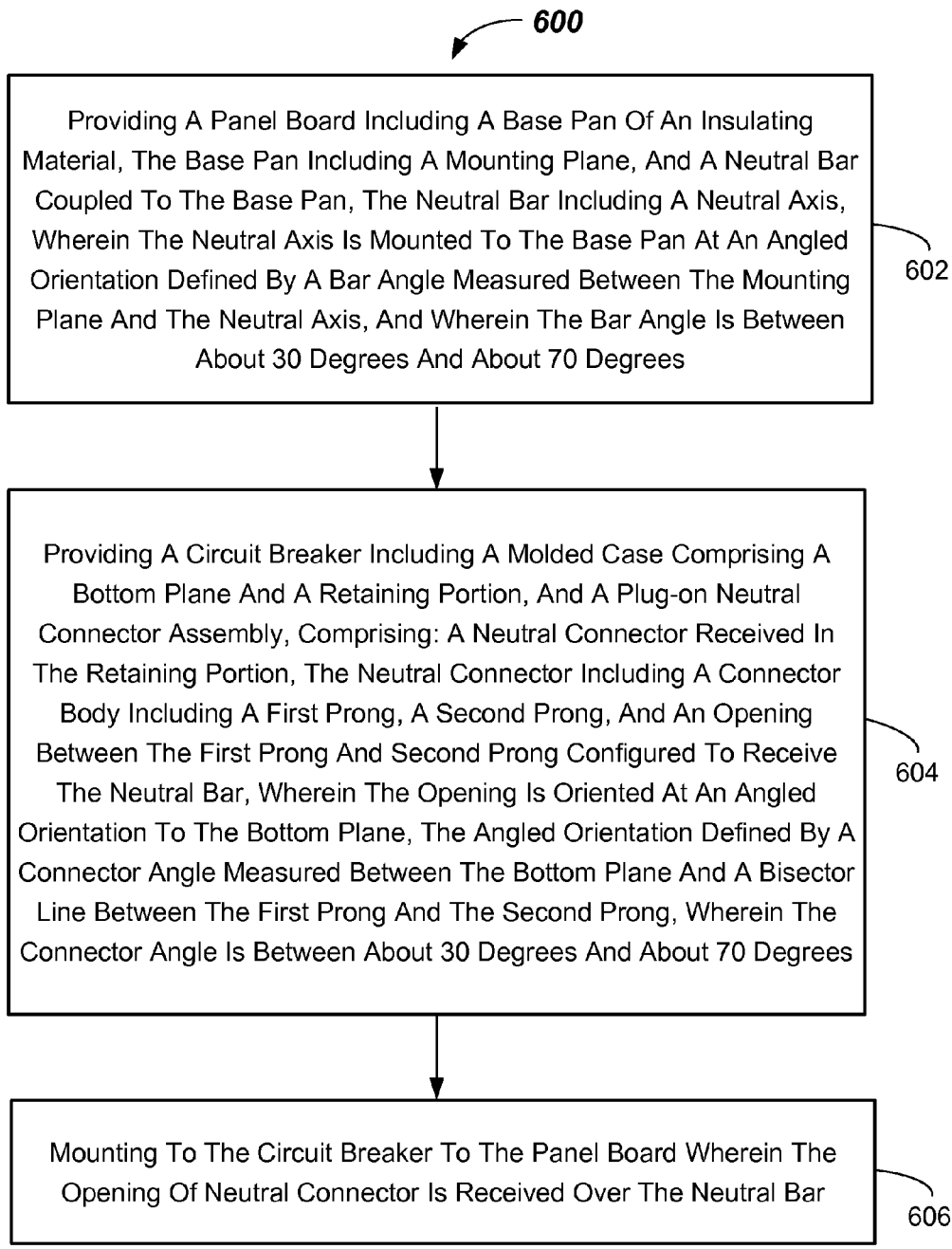
FIG. 6 illustrates a flowchart of a method of making an electrical neutral connection between an angled plug-on neutral and an angled neutral bar according to one or more embodiments.

In another aspect, a method of making an electrical neutral connection is described with reference to FIG. 6. The electrical neutral connection is between a neutral bar (e.g., neutral bar 225) and a neutral connector (e.g., neutral connector 222). In 602, the method 600 includes providing a panel board (e.g., panel board 226) including a base pan (e.g., base pan 250) of an insulating material, the base pan including a mounting plane (e.g., mounting plane 251), and the neutral bar (e.g., neutral bar 225) being coupled to the base pan, the neutral bar including a neutral axis (e.g., neutral axis 253), wherein the neutral axis is mounted to the base pan at an angled orientation defined by a bar angle (e.g., bar angle 255) that is measured between the mounting plane (e.g., mounting plane 251) and the neutral axis (e.g., neutral axis 253) and wherein the bar angle (e.g., bar angle 255) is non-zero and non-ninety and may be between about 30 degrees and about 70 degrees. In other embodiments, the bar angle 255 may be between about 50 degrees and about 70 degrees, or even between about 55 degrees and about 65 degrees. Bar angle 255 may be about 60 degrees in some embodiments.

In 604, the method 600 includes providing a circuit breaker (e.g., circuit breaker 200) including a molded case (e.g., molded case 221) comprising a bottom plane (e.g., bottom plane 221P) and a retaining portion (e.g., retaining portion 221R), and a plug-on neutral connector assembly (e.g., angled plug-on neutral connector assembly 220) comprising a neutral connector (e.g., neutral connector 222) received in the retaining portion, the neutral connector including a connector body (e.g., connector body 224) including a first prong (e.g., first prong 224A), a second prong (e.g., second prong 224B), and an opening (e.g., opening 230) between the first prong and second prong configured to receive the neutral bar (e.g., neutral bar 225), wherein the opening is oriented at an angled orientation to the bottom plane, the angled orientation defined by a connector angle (e.g., connector angle 232) measured between the bottom plane (e.g., bottom plane 221P) and a bisector line (e.g., bisector line 234) between the first prong and the second prong, wherein the connector angle (e.g., connector angle 232) is non-zero and non-ninety and may be between about 30 degrees and about 70 degrees. In other embodiments, the connector angle 232 may be between about 50 degrees and about 70 degrees, between about 55 degrees and about 65 degrees, or even about 60 degrees.

In 606, the method 600 includes mounting to the circuit breaker (e.g., circuit breaker 200) to the panel board (e.g., panel board 226) wherein the opening (e.g., opening 230) of the neutral connector (e.g., neutral connector 222) is received over the neutral bar (e.g., neutral bar 225).

While the invention is susceptible to various modifications and alternative forms, specific embodiments and methods thereof have been shown by way of example in the drawings and are described in detail herein. It should be understood, however, that it is not intended to limit the invention to the particular apparatus, systems or methods disclosed, but, to the contrary, the intention is to cover all modifications, equivalents and alternatives falling within the scope of the invention.

What is claimed is:

1. A panel board, comprising:
   a base pan of an insulating material, the base pan including a mounting plane configured to mount a circuit breaker;
   a neutral bar coupled to the base pan, the neutral bar including a neutral axis, wherein the neutral axis is mounted to the base pan at an angled orientation defined by a bar angle measured between the mounting plane and the neutral axis, and wherein the bar angle is between about 30 degrees and about 70 degrees; and
   a neutral assembly including a cross bar including an angled riser and wherein the neutral bar couples to the angled riser of the cross bar at one end thereof.

2. The panel board of claim 1, wherein the bar angle is between about 50 degrees and about 70 degrees.

3. The panel board of claim 1, wherein an end of the neutral bar is received in a pocket of the base pan.

4. The panel board of claim 1, wherein the angled riser is received through an opening in the base pan.

5. The panel board of claim 1, wherein the bar angle is between about 55 degrees and about 65 degrees.

6. The panel board of claim 1, wherein the neutral assembly includes one or more neutral bus members which include multiple sockets and screws that are adapted to connect neutral wires of various circuits coupled to a circuit breaker.

7. The panel board of claim 1, wherein a neutral terminal is provided on one side or both sides of the neutral assembly.

8. The panel board of claim 7, wherein the neutral terminal is configured to receive a main neutral service line from a utility.

9. The panel board of claim 1, further comprising:
   a barrier member that functions to cover the cross bar below the base pan and function to insulate the neutral assembly from any enclosure that the panel board may be coupled to.

10. The panel board of claim 9, wherein the barrier member is fastened to the base pan by snap features.

* * * * *